Figure 2:
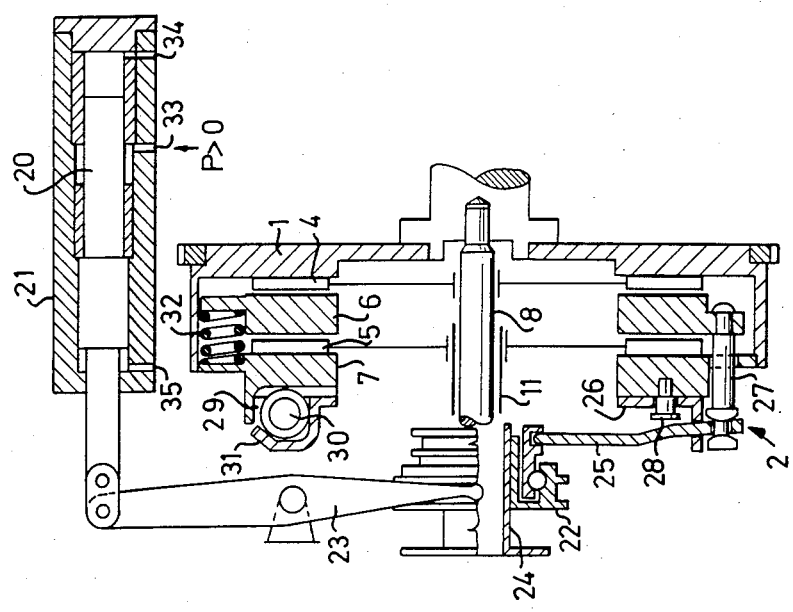

United States Patent [19]

Janiszewski

[11] Patent Number: 4,697,677
[45] Date of Patent: Oct. 6, 1987

[54] MOTOR VEHICLE CLUTCH FOR A MECHANICAL, MULTIPLE-SPEED AUTOMATIC TRANSMISSION

[75] Inventor: Grzegorz K. Janiszewski, Angered, Sweden

[73] Assignee: AB Volvo, Gothenburg, Sweden

[21] Appl. No.: 743,894

[22] Filed: Jun. 12, 1985

[30] Foreign Application Priority Data

Jun. 21, 1984 [SE] Sweden ............................ 8403347

[51] Int. Cl.$^4$ ................... F16D 13/42; F16D 21/06; F16D 43/12
[52] U.S. Cl. ............................ 192/48.91; 74/330; 192/83; 192/87.14; 192/103 A; 192/105 B
[58] Field of Search ............ 192/48.8, 48.9, 48.91, 192/70.23, 70.27, 83, 856, 87.14, 87.18, 87.19, 103 A, 105 B; 74/330

[56] References Cited

U.S. PATENT DOCUMENTS

| 794,899 | 7/1905 | Sturtevant . | |
|---|---|---|---|
| 2,098,716 | 11/1937 | Budlong . | |
| 2,099,141 | 11/1937 | Railton et al. | 74/330 X |
| 2,202,378 | 5/1940 | Hertrich | 74/330 |
| 2,314,226 | 3/1943 | Lee . | |
| 2,315,808 | 4/1943 | Miller | 74/330 |
| 2,379,023 | 6/1945 | Miller | 74/330 X |
| 2,386,217 | 10/1945 | Kegresse . | |
| 2,462,457 | 2/1949 | Berndtson | 74/330 X |
| 2,485,688 | 10/1949 | Banker | 192/48.91 X |
| 2,668,453 | 2/1954 | Banker . | |
| 2,751,055 | 6/1956 | Dodge et al. | 192/48.91 |
| 3,006,449 | 10/1961 | Binder | 192/105 B |
| 3,871,499 | 3/1975 | Kazuma . | |

FOREIGN PATENT DOCUMENTS

| 8103523 | 6/1981 | Sweden . | |
|---|---|---|---|
| 924018 | 4/1963 | United Kingdom | 192/105 B |
| 2099934 | 12/1982 | United Kingdom | 192/105 B |

Primary Examiner—Rodney H. Bonck
Attorney, Agent, or Firm—Young & Thompson

[57] ABSTRACT

The invention relates to a motor vehicle clutch, particularly for a mechanical, multiple-speed automatic transmission. The clutch comprises in a conventional manner, a clutch disc which is non-rotatably joined to an input shaft to the transmission, said disc being pressable against an engine flywheel by a displaceable drive plate. According to the invention the clutch is provided with a second clutch disc, which is non-rotatably joined to a hollow shaft, which is concentrically mounted on the input shaft and can be pressed by the first drive plate against the second drive plate solidly joined to the flywheel.

3 Claims, 4 Drawing Figures

MOTOR VEHICLE CLUTCH FOR A MECHANICAL, MULTIPLE-SPEED AUTOMATIC TRANSMISSION

The present invention relates to a motor vehicle clutch, particularly for a mechanical, multi-speed automatic transmission, comprising a clutch disc which is non-rotatably joined to an input shaft to the transmission, said disc being pressable against an engine flywheel by means of a drive plate which is axially displaceable but non-rotatable relative to the flywheel.

The general purpose of the present invention is, starting from the design principle of a conventional dry single-disc clutch, to achieve a clutch which can be used in a multiple-speed automatic transmission of the type whereby the engine torque is transmitted to the transmission drive gears via two clutches. In a four-speed transmission, for example, the torque is transmitted via one of the clutches to the drive gears for the first and third gear speeds and via the second clutch to the drive gears for the second and fourth gear speeds. Shifting is done by preselection, so that the two drive gears are engaged simultaneously. Prior to shifting from first to second, for example, the drive gear for second is engaged, whereafter the actual shifting is carried out by disengaging the clutch for first and engaging the clutch for second.

Up to now, to do this, two separate clutches have been used on either side of the transmission in the form of multiple-disc fluid drive clutches. Such arrangements are, however, complicated and bulky, which creates problems, especially when used on transverse engines, which place great demands on compactness of design, due to the usually very limited transverse space available in the engine compartment.

A simple, compact and reliable clutch, particularly suited for transverse engines with automatic transmissions, is achieved if a common dry plate clutch of the type described by way of introduction is provided, in accordance with the present invention, with a second drive plate which is solidly joined to the flywheel, a second clutch disc which is arranged between the drive plates and is non-rotatably joined to a hollow shaft which is concentrically mounted on said input shaft, and means through which the first drive plate is, on the one hand, alternately pressable against the discs and, on the other hand, settable in an intermediate position in which both of the discs are not loaded by the first drive plate.

In addition to the above described advantages, such a double clutch has additional advantages over previously known designs. Being a dry disc clutch, it is simple to adjust, since the coefficient of friction is essentially constant. Furthermore, there is no risk of fluid leakage. The design principle with a plate displaceable between two discs completely eliminates the risk of transmission lock, which can occur if two separate clutches should, due to some malfunction, happen to be engaged at the same time, which could have catastrophic results.

By also pressing the drive plate, in accordance with the invention, against the respective disc with the aid of actively controlled, force-actuated means, preferably a hydraulic piston-cylinder device, instead of using the spring means usually used in conventional dry disc clutches, there is achieved a design of optimally short axial length.

Engagement when starting from full stop can in principle be effected by a controlled gradual increase in pressure in the hydraulic cylinder and thus a gradual increase in the pressure of the movable drive plate against one of the discs, but in a preferred embodiment of the clutch according to the invention, the movable drive plate cooperates with a centrifugal device, which, when the drive plate is set in its completely disengaged intermediate position, loads the drive plate towards the disc joined to the first speed drive gear with a force which is dependent on engine speed.

The invention will be described in more detail with reference to examples shown in the accompanying drawings.

Figure 1:
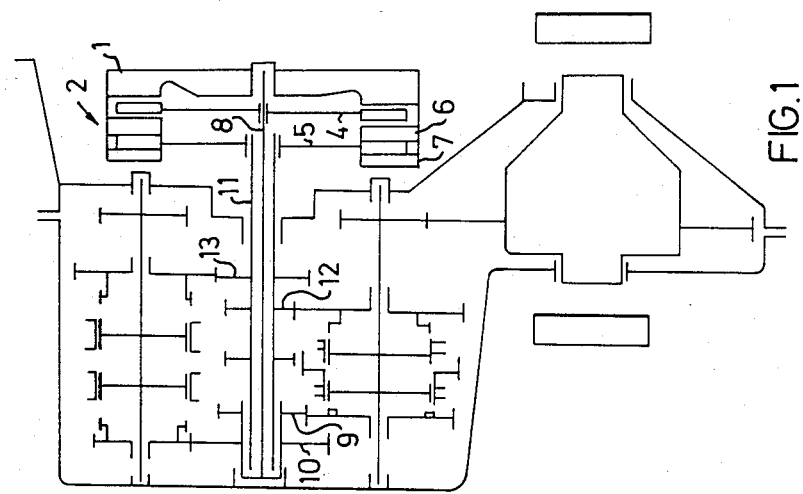
Figure 4:
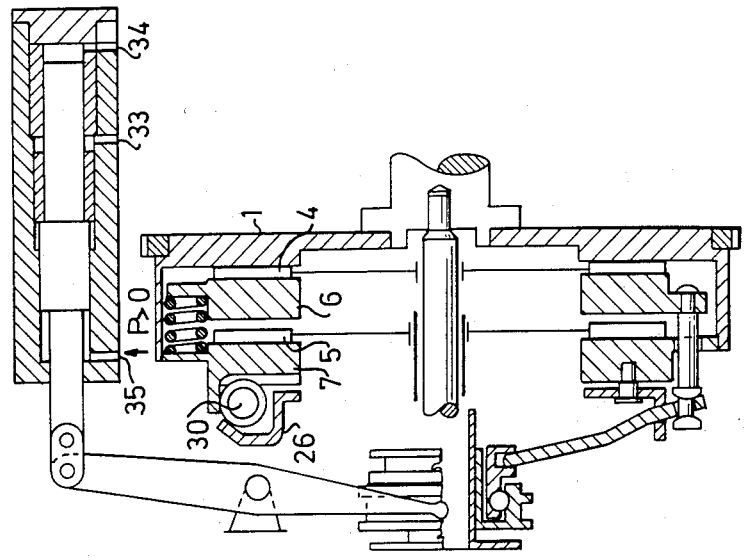
Figure 3:
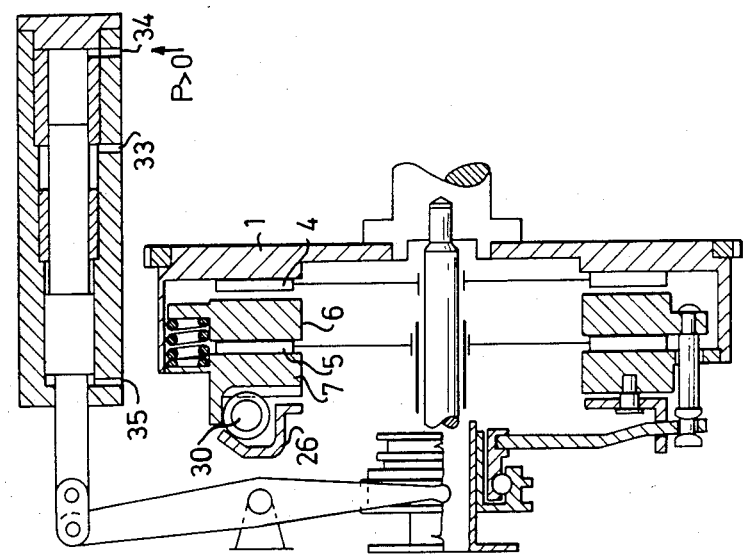

FIG. 1 is a schematic diagram of a transmission designed for a transverse engine, with a clutch device according to the invention, and FIGS. 2–4 show longitudinal sections through an embodiment of the clutch device in its disengaged position and two engaged positions.

In FIG. 1, 1 designates an engine flywheel, to which a clutch, generally designated 2, is connected, comprising a first disc 4, a second disc 5, a drive plate 6, non-rotatably, but axially displaceably connected to the flywheel, and a drive plate 7 solidly joined to the flywheel. The disc 4 is joined to an input shaft 8 which supports the drive gears 9 and 10, respectively, for the second and fourth gear speeds, while the disc 5 is joined to a hollow shaft 11 which is mounted concentrically with the shaft 8 and supports the drive gears 12 and 13, respectively, for the first and third gear speeds.

When driving in first gear, the movable drive plate 6 presses the disc 5 against the fixed drive plate 7, and the hollow shaft 11 is driven while the shaft 8 is disengaged. Prior to shifting to second, preselection takes place by the intermediate shaft gear for the second gear speed locking onto its intermediate shaft in a manner known per se, whereafter the actual shifting process itself takes place by the movable drive plate 6 being displaced to the right in the Figure, so that it releases the disc 5 and presses the disc 4 against the flywheel 1. Disengagement of the shaft 11 and engagement of the shaft 8 thus takes place in a single step resulting in a minimal loss of driving power.

The clutch according to the invention is shown in more detail in FIGS. 2–4, with components corresponding to those in FIG. 1 having the same reference numerals as in FIG. 1.

To achieve the displacement described above of the movable drive plate 6 between its different positions, the drive plate is connected to an actuating means in the form of a piston cylinder device 20,21, the piston 20 of which is connected to a fork 23 which is coupled to an engaging and disengaging bearing 22. The bearing 22 is displaceable on a sleeve 24 and engages the radially inner ends of levers 25, which are pivotally mounted in a carrier plate 26. The radially outer ends of the levers 25 are pivotally joined to pins 27 securely anchored in the drive plate 6. The carrier plate 26 is attached to the fixed drive plate 7 with the aid of pins 28, which permit a limited axial displacement of the carrier plate 26 relative to the drive plate 7.

The carrier plate 26 and the drive plate 7 define between them a plurality of peripherally distributed, radially directed spaces 29 for centrifugal weights 30. The spaces 29 become narrower outwards because the radially outward portion 31 of the carrier plate is inclined towards the drive plate 7, so that the centrifugal weights 30 in their radially outward position press apart the carrier plate 26 and the drive plate 7 against the effect of springs 32 arranged between the drive plates.

FIG. 2 shows the clutch in its disengaged intermediate position, which it assumes through supplying pressure fluid to the cylinder channel 33. The centrifugal weights 30 are in their radially inward position which means that the engine is idling or completely stopped.

When the engine speed increases above idling speed, the centrifugal weights 30 are pressed outwards until they reach, at a certain rpm, the position shown in FIG. 3. The carrier plate 26 and the drive plate 7 have then been pushed apart, so that the carrier plate via the levers 25 and the pins 27 moves the drive plate 6 to be left in the figure, so that the disc 5 driving the hollow shaft 11 with the first gear is also driven. The piston 20, due to the displacement of the bearing 22 caused by the changed position of the carrier plate, has been displaced to the position shown in FIG. 3, where it can be retained regardless of the position of the centrifugal weights by supplying pressure fluid to the cylinder channel 34. This means that first gear can be kept engaged even when the engine speed drops below the engagement speed for the centrifugal weights. This is important in order to still be able to utilize engine braking at low engine speed.

FIG. 4 shows the position of the clutch after shifting from first gear to second gear, for example. The movable drive plate 6, due to the displacement of the piston 20 to the right by supplying pressure fluid to the cylinder channel 35 has released the disc 5 and engaged disc 4 to drive the shaft 8, which carries the drive gear 9 for the second gear speed (FIG. 1). Even in this case, engagement is independent of engine speed, i.e. the position of the centrifugal weights.

Within the scope of the invention it is, however, also possible to completely eliminate the centrifugal control of engagement at start and instead, by means of a control unit responsive to the engine speed produce a gradual increase in pressure in the cylinder chamber into which the channel 34 opens. By using a centrifugal device, which produces a direct mechanical rpm-dependent control of the engagement when starting, both the electronic and hydraulic controls can, however, be simplified.

I claim:

1. Motor vehicle clutch comprising a first clutch disc which is non-rotatably joined to an input shaft of a transmission, said disc being pressable against an engine flywheel by means of a first drive plate which is axially displaceable but non-rotatable relative to the flywheel; a second drive plate which is solidly joined to the flywheel; a second clutch disc which is arranged between the drive plates and is non-rotatably joined to a hollow shaft which is concentrically mounted on said input shaft; means by which the first drive plate can be alternatively pressed against either disc or set in an intermediate position in which both of the discs are not loaded by the first drive plates, and a centrifugal device which, when the first drive plate is set in said intermediate position, loads the first drive plate in a direction towards the second disc with a force dependent on engine speed.

2. Motor vehicle clutch comprising a clutch disc which is non-rotatably joined to an input shaft of a transmission, said disc being pressable against an engine flywheel by means of a first drive plate which is axially displaceable but non-rotatable relative to the flywheel; a second drive plate which is solidly joined to the flywheel; a second clutch disc which is arranged between the drive plates and is non-rotatably joined to a hollow shaft which is concentrically mounted on said input shaft; and actively controlled, force-actuated means through which the first drive plate can be alternatively pressed against either disc or set in an intermediate position in which both of the discs are not loaded by the first drive plate, the first drive plate being connected to levers which engage an axially displaceable engaging and disengaging bearing which is mounted concentrically with the shafts, said levers being pivotally mounted in a carrier element joined to the second drive plate, the carrier element being limitedly axially displaceable relative to the second drive plate and together therewith defining radially outwardly narrow spaces for centrifugal weights, said levers being joined to the first drive plate in such a manner that radial displacement outwardly of the centrifugal weights results in displacement of the first drive plate toward the second disc.

3. Clutch according to claim 2, characterized in that springs are arranged between the drive plates and urge said plates away from each other.

* * * * *